April 6, 1943. P. O. CHAMBERS 2,315,934
TIRE VULCANIZING EQUIPMENT
Filed July 8, 1941 4 Sheets-Sheet 1

Fig. 1

INVENTOR.
PERRY O. CHAMBERS
BY Ralph Barrow

April 6, 1943.   P. O. CHAMBERS   2,315,934
TIRE VULCANIZING EQUIPMENT
Filed July 8, 1941          4 Sheets-Sheet 2
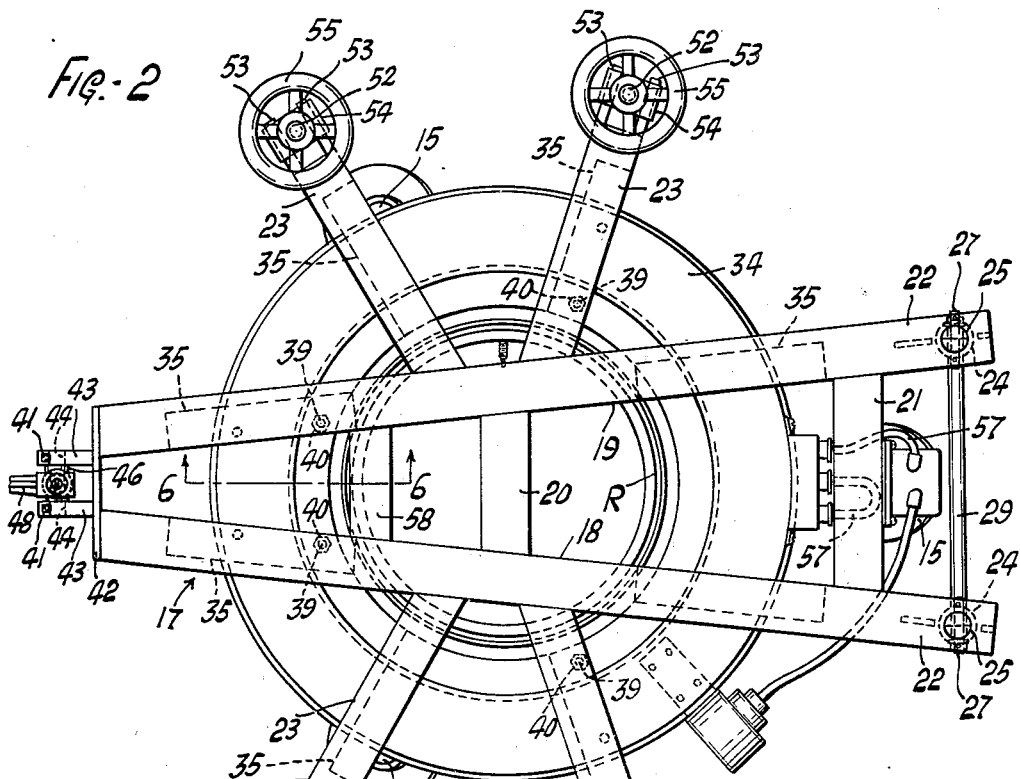
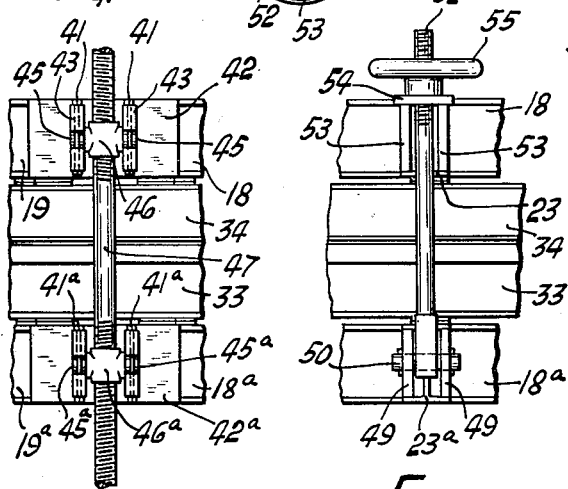
INVENTOR
PERRY O. CHAMBERS
BY Ralph Barrow April 6, 1943.   P. O. CHAMBERS   2,315,934
TIRE VULCANIZING EQUIPMENT
Filed July 8, 1941   4 Sheets-Sheet 3
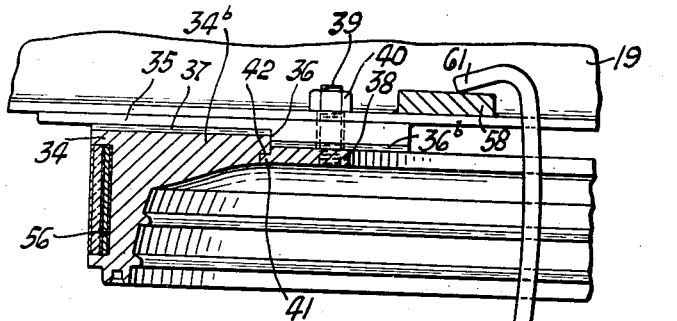
Fig.-6
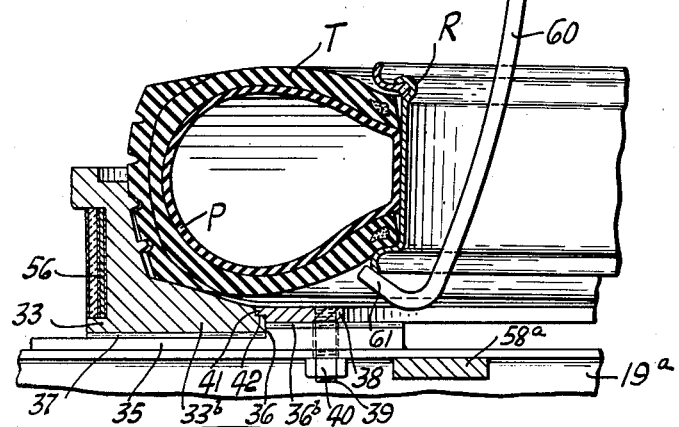
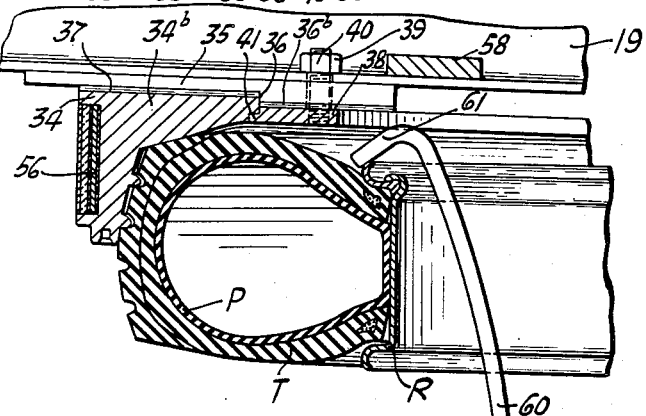
Fig.-7
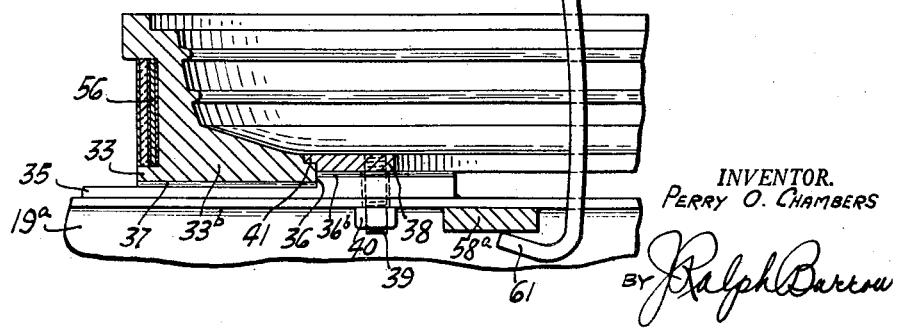
INVENTOR.
PERRY O. CHAMBERS
BY Ralph Barrow

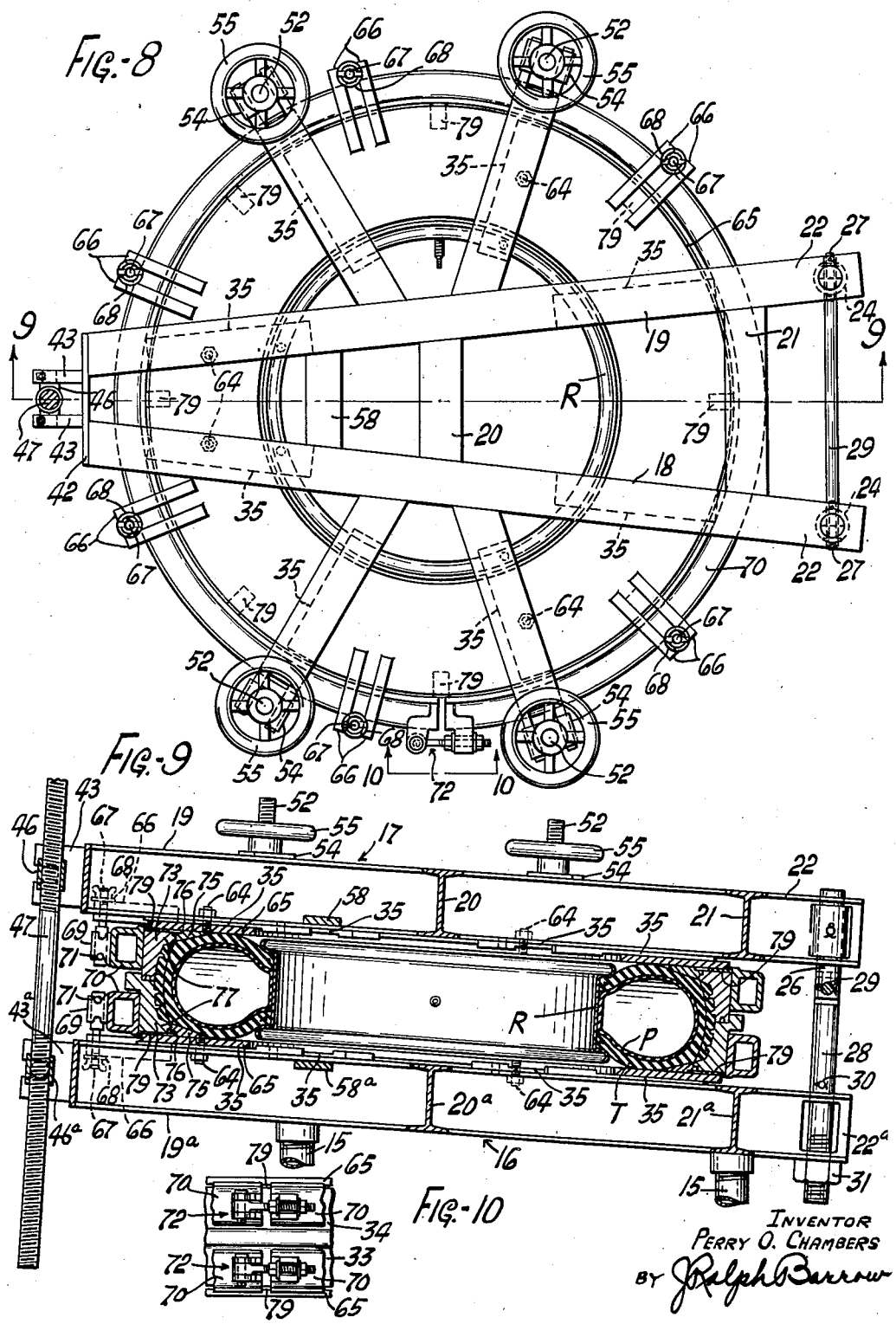

Patented Apr. 6, 1943

2,315,934

UNITED STATES PATENT OFFICE 2,315,934

TIRE VULCANIZING EQUIPMENT

Perry O. Chambers, Chicago, Ill., assignor to Safety Vulcanizer Company, Chicago, Ill., a corporation of Illinois Application July 8, 1941, Serial No. 401,500

9 Claims. (Cl. 18—18)

This invention relates to vulcanizers, and in particular relates to full circle retreading or recapping vulcanizers.

An object of this invention is to provide a full circle retreading or recapping vulcanizer, including relatively movable platen members for supporting registering tread matrices, in which said platen members comprise fabricated structures of sectional beams integrally connected with outwardly extending ends for attachment of the usual hinges, clamps and like fittings, whereby the usual heavy, expensive platen castings may be supplanted by strong, light-weight platens.

Another object of the invention is to provide a vulcanizer of the class described in which is obviated the usual tendency of cast platen members to become sprung or warped to prevent accurate registry of the tread matrices.

Another object of the invention is to provide in a vulcanizer of the character described improved means for releasably supporting a relatively wide range of tread matrix sizes in the platen members, in which said matrix supporting means will not be substantially disturbed by clamping action of the platen members on the tread matrices.

Still another object of the invention is to provide simple, effective means operable by the opening movement of the vulcanizer for loosening vulcanized tires from the matrix cavities.

These and other objects of the invention will be manifest from the following brief description and the accompanying drawings.

Of the accompanying drawings:

Figure 1 is a vertical cross-section through a vulcanizer embodying the invention, in closed position.

Figure 2 is a plan view of the vulcanizer shown in Figure 1.

Figure 3 is a fragmentary elevational view of the vulcanizer, partly broken away, illustrating a vulcanizer opening and closing screw, as viewed from the left of Figures 1 and 2.

Figure 4 is a fragmentary elevational view of the vulcanizer illustrating a platen clamping screw.

Figure 5 is a fragmentary elevational view of the vulcanizer, illustrating the hinge construction thereof, as viewed from the right of Figure 2.

Figures 6 and 7 are fragmentary cross-sections taken substantially on line 6—6 of Figure 2, in an intermediate opening position of the vulcanizer, illustrating improved means for loosening a vulcanized tire from the lower and upper matrix cavities, respectively.

Figure 8 is a plan view of a full-circle retreading or recapping vulcanizer embodying another form of the invention.

Figure 9 is a cross-section taken substantially on line 9—9 of Figure 8.

Figure 10 is a fragmentary view taken at 10—10 in Figure 8.

Referring to Figures 1 to 7 of the drawings, and particularly to Figures 1 and 2, the numerals 15, 15 designate legs for supporting a relatively fixed lower platen member 16, and the numeral 17 designates an upper platen member which is hingedly mounted to be swung from and toward spaced superposed relation thereto.

The upper and lower platens, in general preferably are alike and hence a description of the upper platen will suffice also for the lower platen, like parts of the lower platen being given like numerals with suffixes a. The upper platen may comprise a pair of longitudinal I-beams 18 and 19, connected, as by welding, by relatively short I-beam 20 at the vertical center of the vulcanizer and a longer I-beam 21 in spaced relation thereto, whereby the I-beams 18 and 19 extend in a plane in divergent relationship to provide a pair of spaced extensions, or arms 22, 22 at one side of the vulcanizer for mounting, hinge connections between the upper and lower platens to be described later. Connected or jointed to the outer sides of the beams 18 and 19, as by welding, and extending radially outwardly of said vertical center of the vulcanizer, may be a plurality of relatively short I-beams 23, 23 which constitute clamping arms, four of these arms being shown. The arms 23 preferably are so angularly arranged with respect to beams 18 and 19 that points of intersection of a pitch circle, the radius point of which is at the vertical center of the vulcanizer, crosses arms 21, 22 and 23, and through a line bisecting beams 18 and 19 at the relatively closely spaced ends thereof, will be more or less equidistant from each other.

The hinge connections between the upper and lower platen members 17 and 16 are best shown in Figures 1, 2 and 5. The central webs of the I-beam arms 22, 22 of the upper platen are cut out to permit welding therein sleeves 24, 24, and the upper and lower flanges of these I-beam arms are apertured, as indicated at 25, 25 to communicate with the openings through said sleeves. Rods 26, 26 received through sleeves 24 are secured therein by pins 27, 27 extended through said sleeves and rods. The lower hinge arms 22ª, 22ª are apertured through the flanges and central webs thereof to receive rods 28, 28 which have upward extensions pivotally connected to downward extensions of upper rods 26, by means of a pin 29 received through cooperating openings in overlapping ends of the rods 26 and 28, downward movement of lower rods 28 being limited by pins 30 extended therethrough and engageable with the upper flanges of arm 22ª. In an initial closed position of the vulcanizer slight play is allowed between stop pins 30 and arms 22ª to permit application of clamping pressure between the platen members, by turning nuts 31, 31, threaded on the lower ends of rods 28, against the under flanges of lower hinge arms 22ª.

As best shown in Figures 1, 2, 6 and 7, lower and upper tread matrices 33 and 34 may be releasably secured to the lower and upper platens 16 and 17, respectively, so as to be quickly interchangeable with matrices for varying tread designs and for a wide range of tire sizes. To this end, matrix-seating pads 35, 35 are welded on the inner faces of the I-beams 18ª, 19ª and 23ª, and 18, 19 and 23, of the lower and upper platens, respectively, to be substantially uniformly circumferentially spaced, these pads being relatively thick at the radially inner ends thereof to provide shoulder portions 36, 36, for engaging inner peripheral edge portions of the matrices to center said matrices on the respective platen. Suitable heat-insulating shims 37, 37 may be inserted between the relatively thin seating portions of the pads and the matrices as required. For releasably supporting the matrices on the platens there may be provided relatively flat locking rings 38, 38 having studs 39, 39 on one side thereof engageable through apertures in the thick inner end portions of the pads and through apertures in the inner flanges of the various I-beams of the platens, nuts 40 threaded on these studs being engageable with said apertured flanges of the I-beams to draw said rings toward said pads 35. Further, the locking rings 38 may have reduced annular lips 41 for interengaging in annular recesses 42 provided at the inner corners of the usual inwardly extending side walls 33ᵇ and 34ᵇ of the matrices 33 and 34, whereby tightening the nuts 40 on studs 39 to draw the rings 38 toward the respective platens will clamp the matrices against the seating pads 35. Heat-insulating shims or spacers 36ᵇ may be inserted between the rings 38 and pads 35.

As best shown in Figures 1, 2 and 3, manually operable means is provided for swinging the upper platen 17 on pivot 29 from and toward closed registering relation of the matrices 33 and 34. For this purpose, across the closely spaced ends of I-beams 18 and 19 of platen 17 is welded a bracket 42 having transversely spaced lugs 43, 43, which are recessed at 44, 44 pivotally to receive trunnions 45, 45 of an internally threaded sleeve 46. Pins or bolts 41 extend through lugs 43 to retain the trunnions 45 in the recesses 44. A similar bracket is mounted on the ends of the I-beams 18ª and 19ª of the fixed lower platen like parts being given like numerals with a suffix a, the internal threads of pivoted sleeve 46ª, however, being opposite hand from the threads of sleeve 46. Threaded through the sleeves 46 and 46ª may be correspondingly oppositely threaded ends of a screw shaft 47, on the upper end of which is a suitable handle or wrench 48. Operation of the handle to turn screw shaft 47 in the proper directions will swing platen 17 on pivot 29, between the full and chain-dotted positions shown in Figure 1.

Means is provided for applying heavy clamping pressure to the platens 16 and 17, to retain the matrices in registering relation about a retreaded or recapped tire T being vulcanized in the vulcanizer. The outer ends of the lower clamping arms 23ª have welded between the flanges thereof transversely spaced plates 49, 49 which are apertured to receive pins 50 on which are pivoted at one end clamping rods 52, 52 (see Figures 2 and 4), the ends of arms 23ª being suitably cut away to permit the rods to swing upwardly on pivots 50 to substantially vertical position. The outer ends of the upper clamping arms 23 are similarly provided with spaced plates 53, 53, portions of the arms being cut away to permit the rods 52 of the corresponding arms 23ª to be freely inserted between said spaced plates 53. A washer or plate 54 is slidably received on each rod 52 to be urged against the upper edges of spaced plates 53, by turning a hand wheel 55 threaded on the free end of rod 52, to apply the desired clamping pressure between the platens.

In order to maintain equalized pressure at all points of registry of the matrices 33 and 34, the opening and closing screw 47 may be adjusted to urge the platens together with clamping pressure, and similarly the nuts 31, 31 on hinge rods 28, 28 may be turned against the hinge arms 22ª, 22ª to apply clamping pressure at the hinged side of the vulcanizer.

Vulcanizing heat may be applied to the matrices 33 and 34 through annular electric heating elements 56 mounted in annular grooves on the outer peripheries thereof, electrical current being supplied to the elements through conduits 57 from a suitable source of supply.

Cross-bars 58, 58ª may be mounted between the inner lower flanges of I-beams 18 and 19, and 18ª and 19ª, respectively, at points to be slightly radially inwardly of a rim R of a tire and rim assembly in the vulcanizer, at the side of the latter opposite from the hinge pin 29. The function of these cross-bars will be best described in the description of the operation of the vulcanizer.

In the general operation of the above described vulcanizer a tire T, mounted on a rim R with a pressure bag P within the tire casing, and which has previously had its old tread rubber replaced by new "camelback," is placed in the lower matrix 33 while the upper platen is in the chain-dotted position shown in Figure 1. By turning handle 48 on screw shaft 47 the upper platen 17 is swung on hinge pivot 29 until the matrices 33 and 34 are in registry about the tire. Next the clamping rods 52 on the clamping arms 23ª are swung upwardly to position for turning the wheels 55 against the plates 54 engaging the top edges of spaced plates 53 on the corresponding upper clamping arms 23, thereby to apply clamping pressure between the registering matrices. By additional turning movement of screw shaft 47, and by turning nuts 31 on lower hinge rods 28, the clamping action between the matrices may be equalized. With the proper degree of pressure in bag P, and under the influence of heat from the elements 56, the new tread stock may be vulcanized onto the tire T. At the end of the curing cycle the pressure within bag P is released, and the wheels 55 are turned to permit swinging the clamping rods 52 downwardly of the upper platens. By operating the screw shaft 47 the upper platen is urged toward the open position shown in Figure 1.

During the opening movement of platen 17 the tire T may stick in either matrix section and it then becomes necessary to pry the tire loose. As best shown in Figure 6, should the tire stick in the lower matrix a tool 60 is utilized, this tool comprising a curved elongate bar having in-turned, relatively short end portions 61, 61. By engaging one of the end portions 61 under the lower rim flange and the other end portion 61 over the cross-piece 58 on the upper platen, while screw shaft 47 is being operated to open the vulcanizer, the tire will be loosened from lower matrix section. Similarly, the tire may be loosened from the upper matrix by engaging the ends 61 of tool 60 between upper rim flange and the cross-piece 58a on the lower platen.

In Figures 8 and 9 are illustrated the manner in which the fabricated vulcanizer platens previously described are readily adaptable to support matrix and heating units of the type shown and described in co-pending application Serial No. 270,333, now Patent No. 2,266,720. As the platen structure is the same, including the seating pads 35, like parts are given like numerals, as above described, unless otherwise stated.

Mounted on the platens 16 and 17 to seat on the pads 35 may be flat adapter rings 65, 65, these being interchangeably secured in place by means of studs 64 on the rings projecting through apertures in the pads and through the inner I-beam flanges of the platens, and nuts threaded on said studs engaging said flanges. Welded or otherwise secured on the outer sides of adapter rings 65, at circumferentially spaced intervals to be between the I-beam structures of the platens, may be spaced, radially outwardly bars 66, 66, for receiving therebetween bolts 67 on which are received clamping washers 68 to be urged against bars 66 by thumb screws threaded on ends of the bolts. The other ends of bolts 67 are freely engageable between spaced lugs 69, 69 on split heating rings 70, there being oppositely disposed pins or trunnions 71 engaging in recesses on the inner edges of the lugs, whereby the heating rings are supported on the respective platens by said bolts. The heating rings 70 are provided with suitable releasable clamping means 72, 72 (see Figure 10) for clampingly engaging the outer peripheries of matrix sections 73, 73, as shown in Figures 8 and 9, the arrangement being such that the heating rings, through bolts 67, normally support the matrices against the adapter rings 65. When the platens 16 and 17 are clamped together, as previously described, however, the matrices will be backed and supported solely by the platens, the heating rings being so positioned on the matrices as to be out of contact with the platens and with each other. Insulating strips 79 are inserted between the matrices and the adapter rings 65 to minimize loss of heat by conduction to the platens.

Tapered rings 75 may be retained against the adapter rings 65 by annular lips 76 thereon engaging in annular recesses provided at the outer corners of inwardly extending walls 77 of the matrices. These rings 75 serve to confine the side portions of a tire in the vulcanizer inwardly of the walls 77 of the matrices.

Thus has been provided a strong, light-weight repair vulcanizer, which is thermally efficient because of the open nature of the fabricated upper and lower platen members. Substantially only the matrices are heated because they are supported against the platens at relatively few points and then only through heat insulating strips.

Modifications of the invention may be resorted to without departing from the spirit of the invention or the scope of the appended claims.

What is claimed is:

1. A vulcanizer of the character described comprising a relatively fixed lower platen and a relatively movable upper platen in spaced superposed relation thereto, said platens each being correspondingly fabricated from sectional beams having welded connecting joints, said platens each including a pair of elongated beams extending transversely in divergent relationship in the plane thereof, one or more sectional beams rigidly connecting said elongate beams, extensions of said elongated beams at the more widely separated ends of the pairs thereof providing spaced hinge arms at one side of the vulcanizer, a plurality of length of sectional beams fixedly connected at ends thereof to said elongate beams to provide clamping arms extending radially outwardly with respect to the center of the vulcanizer, hinge means mounted between each pair of corresponding upper and lower hinge arms of said upper and lower platens, releasable clamping means cooperatively mounted on said upper and lower clamping arms for clamping said platens together, and annular tread matrices mounted on said upper and lower platens for registry with each other when the platens are clamped together.

2. A vulcanizer of the character described comprising a relatively fixed lower platen and a relatively movable upper platen in spaced superposed relation thereto, said platens each being correspondingly fabricated from sectional beams having welded connecting joints, said platens each including a pair of elongated beams extending transversely in divergent relationship in the plane thereof, one or more sectional beams rigidly connecting said elongate beams, extensions of said elongated beams at the more widely separated ends of the pairs thereof providing spaced hinge arms at one side of the vulcanizer, a plurality of lengths of sectional beams fixedly connected at the ends thereof to said elongate beams to provide clamping arms extending radially outwardly with respect to the center of the vulcanizer, hinge means mounted between each pair of corresponding upper and lower hinge arms of said upper and lower platens, releasable clamping means cooperatively mounted on said upper and lower clamping arms for clamping said platens together, annular tread matrices mounted on said upper and lower platens for registry with each other when the platens are clamped together, said matrices having radially inwardly extending annular side walls for engaging the side portions of a tire and having annular recesses at the inner corners thereof, annular locking members for each of said matrices, means for removably mounting said locking members on said platens, said locking members having portions for engaging in said recesses of said side walls to support said matrices on the respective platens.

3. A vulcanizer of the character described comprising a relatively fixed lower platen and a relatively movable upper platen in spaced relation thereto, said platens each being correspondingly fabricated from sectional beams having welded connecting joints, said platens each including a pair of elongated beams extending transversely in divergent relationship in the plane thereof, one or more lengths of sectional beams rigidly connecting said elongate beams, extensions of said elongated beams at the more widely separated ends of the pairs thereof providing spaced hinge arms thereon at one side of the vulcanizer, a plurality of lengths of sectional beams fixedly connected at ends thereof to said elongate beams to provide clamping arms extending radially outwardly with respect to the center of the vulcanizer, hinge means mounted between each pair of corresponding upper and lower hinge arms of said upper and lower platens, releasable clamping means cooperatively mounted on said upper and lower clamping arms for clamping said platens together, annular tread matrices mounted on said upper and lower platens for registry with each other when the platens are clamped together, annular locking members for each of said matrices, interengaging annular portions on said locking members and on the inner peripheries of said matrices, and means for releasably securing said locking members on said platens to support the matrices thereon through said interengaging annular portions.

4. A vulcanizer of the character described comprising a relatively fixed lower platen, and a relatively movable upper platen in spaced relation thereto, said platens each being correspondingly fabricated from sectional beams having welded connecting joints, said platens each including a pair of elongated beams extending transversely in divergent relationship in the plane thereof, one or more lengths of sectional beams rigidly connecting between said pairs of elongated beams, extensions of said elongated beams at the more widely separated ends of the pairs thereof providing spaced hinge arms at one side of the vulcanizer, a plurality of lengths of sectional beams connected to said elongate beams to provide clamping arms extending radially outwardly with respect to the center of the vulcanizer, hinge means mounted between each pair of corresponding upper and lower hinge arms of said upper and lower platens, releasable clamping means cooperatively mounted on said upper and lower clamping arms for clamping said platens together, annular tread matrices mounted on said upper and lower platens for registry with each other when the platens are clamped together, each of said hinge means including a pair of elements pivotally connected to each other, one of each pair of said hinge elements being adjustable with respect to its hinge arms, and means for adjusting said adjustable elements to apply clamping pressure to said matrices at the hinged side of the vulcanizer.

5. A vulcanizer of the character described comprising a relatively fixed lower platen and a relatively movable upper platen in spaced superposed relation thereto, said platens each being correspondingly fabricated from sectional beams having welded connecting joints, said platens each including a pair of elongated beams extending transversely in divergent relationship in the plane thereof, one or more lengths of sectional beams rigidly connecting between said elongate beams, extensions of said elongated beams at the more widely separated ends of the pairs thereof providing spaced hinge arms at one side of the vulcanizer, a plurality of lengths of sectional beams connected to said elongate beams to provide clamping arms extending radially outwardly with respect to the center of the vulcanizer, hinge means mounted between each pair of corresponding upper and lower hinge arms of said upper and lower platens, releasable clamping means cooperatively mounted on said upper and lower clamping arms for clamping said platens together, annular tread matrices mounted on said upper and lower platens for registry with each other when the platens are clamped together, said tread matrices engaging said elongate beams and said clamping arms of the respective platens at circumferentially spaced points, each of said hinge means including a pair of elements pivotally connected to each other, one of each pair of said hinge elements being adjustable with respect to its hinge arms, means for adjusting said adjustable elements to apply clamping pressure to said matrices at the hinged side of the vulcanizer, brackets mounted across the more closely spaced ends of said pairs of elongate beams of said upper and lower platens, oppositely internally threaded members pivotally mounted on said brackets, a screw shaft having opposite threads at opposite ends thereof threaded through said threaded members, and means for turning said shaft to swing said platens from and toward each other on said hinge means, said screw shaft being operable on said platens to apply clamping pressure between said registering matrices.

6. A vulcanizer of the character described comprising relatively movable upper and lower platens, separate annular tread matrices mounted on said platens for registry when the platens are moved toward each other, each of said platens being fabricated from lengths of sectional beams welded together at joints between the same to provide an integral structure having a plurality of arms extending substantially radially of the center of the vulcanizer, the arms of one of said platens being adapted to be in superposed relation to corresponding arms of the other platen in the closed position of the vulcanizer, said annular tread matrices engaging said radially extending arms of the respective platens at circumferentially spaced points, hinge means connected between two adjacent superposed pairs of said arms on the upper and lower platens, and releasable clamping means on a plurality of other superposed pairs of said arms on said platens for clamping said platens together.

7. A vulcanizer of the character described comprising relatively movable upper and lower platens, separate annular tread matrices mounted on said platens for registry when the platens are moved toward each other, each of said platens being fabricated from lengths of sectional beams welded together at joints between the same to provide an integral structure, having a plurality of arms extending substantially radially of the center of the vulcanizer, the arms of one of said platens being adapted to be in superposed relation to corresponding arms of the other platen in the closed position of the vulcanizer, said annular tread matrices engaging said radially extending arms of the respective platens a circumferentially spaced points, hinge means connected between two adjacent superposed pairs of said arms on the upper and lower platens at one side of the vulcanizer, screw means adjustably mounted between superposed arms on the opposite side of the vulcanizer from said hinge means and adjustable to move said platens on said hinge means toward and from registering relation of said matrices, and releasable clamping means on a pluraltiy of other superposed pairs of said arms on said platens for clamping said platens together.

8. A vulcanizer of the character described comprising relatively movable upper and lower platens, separate annular tread matrices mounted on said platens for registry when the platens are moved toward each other, each of said platens being fabricated from sectional beams welded together at joints between the same to provide a plurality of arms extending substantially radially of the center of the vulcanizer, the arms of one of said platens being adapted to be in superposed relation to corresponding arms of the other platen in the closed position of the vulcanizer, said annular tread matrices engaging said radially extending arms of the respective platens at circumferentially spaced points, hinge means connected between two adjacent superposed pairs of said arms on the upper and lower platens, said hinge means including adjustable means for applying clamping action between said platens at the hinged sides thereof, screw means adjustably mounted between superposed arms on the opposite side of the vulcanizer from said hinge means and adjustable to move said platens on said hinge means toward and from registering relation of said matrices, and releasable clamping means on a plurality of other superposed pairs of said radial arms on said platens for clamping said platens together.

9. A vulcanizer of the character described comprising relatively movable upper and lower platens, separate annular tread matrices mounted on said platens for registry when the platens are moved toward each other, each of said platens being fabricated from lengths of sectional beams welded together at joints between the same to provide an integral structure having a plurality of arms extending substantially radially of the center of the vulcanizer, the arms of one of said platens being adapted to be in superposed relation to corresponding arms of the other platen in the closed position of the vulcanizer, said annular tread matrices engaging said radially extending arms of the respective platens at circumferentially spaced points, hinge means connected between two adjacent other superposed pairs of said arms on the upper and lower platens, heat-insulating means between said annular matrices and said platens at said circumferentially spaced points and releasable clamping means on a plurality of superposed pairs of said arms on said platens for clamping said platens together.

PERRY O. CHAMBERS.